Aug. 28, 1956     T. W. HELM ET AL     2,760,358
UNIVERSAL JOINT
Filed March 15, 1954
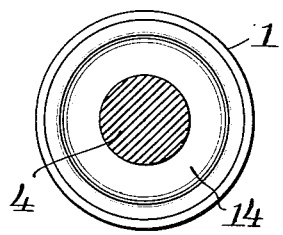
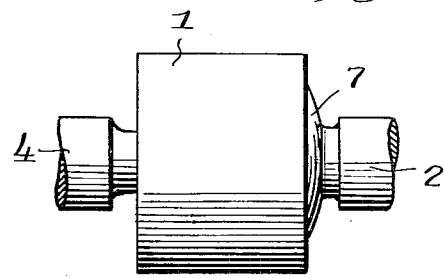
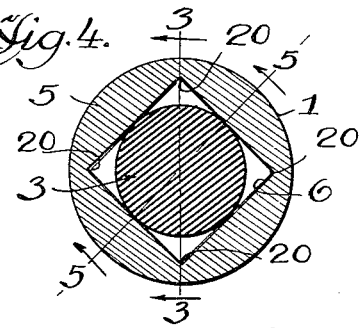
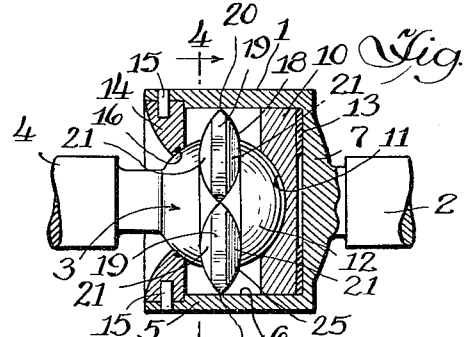
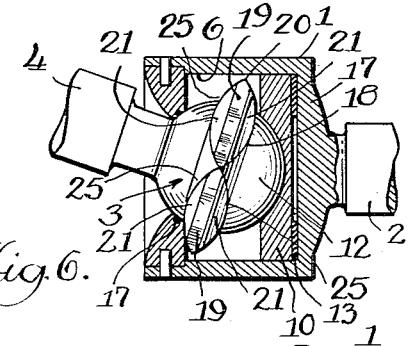
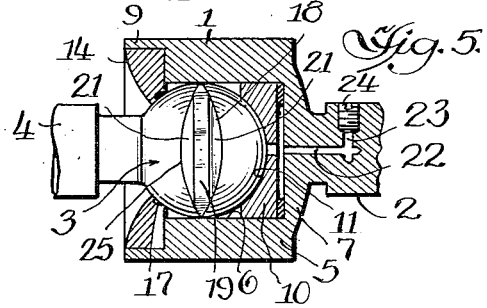
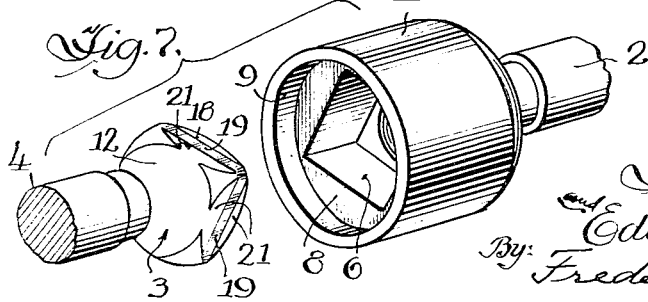
Inventors,
Tony W. Helm
and Edward A. Derieg,
By: Frederick F. Mason
Atty.

United States Patent Office 2,760,358
Patented Aug. 28, 1956

2,760,358

UNIVERSAL JOINT

Tony W. Helm and Edward A. Derieg, Chicago, Ill.

Application March 15, 1954, Serial No. 416,202

1 Claim. (Cl. 64—7)

This invention relates to a universal joint, and more particularly to a universal joint of novel construction, having greater efficiency and durability, and capable of positively transmitting greater power, in difficultly accessible and angular positions, than possible in universal joints heretofore known.

Universal joints, as known prior to the present invention, have had many disadvantages, among which may be mentioned, the use of pins for transmitting power, which pins are subject to the weakness of shearing and looseness thus causing them to be of short life as well as inefficient; and the failure to form and arrange the power transmitting portions in a manner to transmit the maximum of power when the shafts are in angular position.

The universal joint of the present invention is capable of use for general work in mechanic's tools, as in applying and removing nuts, and applying a turning force to any parts requiring the same, in difficultly accessible positions where the power delivering and power receiving parts necessitate being angularly positioned with relation to each other; and for use in driving two angularly positioned shafts for transmitting power for various purposes.

An important feature of the present invention is the provision of a plurality of angularly arranged widened faces on the sides of the male member of the joint, each of these widened faces at its opposite ends having a tapered portion which symmetrically meets the adjacent tapered portion of the adjacent angularly positioned widened face. The female portion of the joint has a socket with a plurality of flat side walls, each adjacent pair thereof being joined by straight-line edges thus forming a straight groove at each corner, along which grooves the corresponding tapered portions of the widened faces on the sides of the male member travel, thus allowing free angular movement of the male member in the socket of the female member, while at the same time transmitting maximum rotational power through contact of the widened faces with the side walls of the socket opening.

Among the objects of the present invention are: to provide a new and improved universal joint; to provide a universal joint having contacting driving faces, and capable of relative angular movement between the driving and the driven parts; to accomplish the advantages and overcome the disadvantages referred to above; and such further objects, advantages and capabilities inherently possessed by the present invention as will later more fully appear.

Our invention further resides in the combination, construction and arrangement of parts illustrated in the accompanying drawing, and while we have shown therein a preferred embodiment, we wish it understood that the same is susceptible of modification and change without departing from the spirit of the invention.

In the drawing:

Fig. 1 is a side elevation of a universal joint embodying our invention, and showing the driving and driven shafts in axial alinement.

Fig. 2 is an end elevation looking toward the left hand side of Fig. 1.

Fig. 3 is a longitudinal section through the female member of the universal joint on the line 3—3 of Fig. 4, but showing the male member in elevation for the sake of clearness, and with the two shafts in axial alinement.

Fig. 4 is a transverse section on the line 4—4 of Fig. 3.

Fig. 5 is a longitudinal section through the female member on the line 5—5 of Fig. 4, but showing the male member in elevation, and the two shafts in axial alinement.

Fig. 6 is a view similar to Fig. 3, but showing the male member and its shaft in angular position with relation to the female member and its shaft.

Fig. 7 is a perspective view showing the male member separated from the female member, and in position to be inserted thereinto.

Referring more in detail to the drawing, our invention, which is shown for illustrative purposes therein, comprises in general a metal female member 1 having a shaft 2 fixed thereto, and a metal male member 3 having a shaft 4 fixed thereto. Shafts 2 and 4 may be integral with the female and male members respectively, as shown, or secured thereto in any manner desired, to rotate therewith. Either of the male or female members may be the driving or driven part, as desired.

The female member 1 comprises a metal body portion 5, whose exterior surface may be of cylindrical or other contour as desired, and having a square, longitudinally extending socket or opening 6 formed therein, which socket, at its inner end, is closed by a sturdy end wall 7 to which is integrally or otherwise secured the shaft 2, the longitudinal axis of which is in alinement with the center of rotation of the female member 6. The end of the socket 6, opposite from the end wall 7, stops short of the adjacent end of the female member, to form the shoulder 8, beyond which extends for a short distance to skirt 9, the outer surface of which forms a continuation of the outer surface of the female member 1, as seen in Fig. 7.

Mounted inside of the socket 6 is a metal bearing plate 10 having formed in its inner face a centrally located, spherically curved, depression 11, within which is seated the adjacent face of the hardened steel ball 12 of the male member 3. Between the outer face of the bearing plate 10 and the inner face of the end wall 7 is mounted a spring washer 13, so formed as to normally urge the bearing plate 10 against the ball 12 to maintain a sliding contact therebetween when the male member is in operative position within the socket 6. Positioned snugly within the skirt 9 and bearing against the shoulder 8, is a metal retaining ring 14, which is held fixed in such position by any desired number of pins 15, or other suitable fastening means. The inner edge of retaining ring 14 is formed with a spherically curved annular surface 16 to correspond with the curvature of the adjacent face of the ball 12 to facilitate rotation of the ball therein as the ball is swung to its various angular positions, and at the same time retain the ball within socket 6 and against bearing plate 10, and retain grease within the socket around the ball. While not necessary, a strip of packing material 17, if desired, may be secured to the inner edge of the retaining ring 14, to further assist in retaining grease within the socket 6, as shown in Fig. 5.

The socket 6 is preferably square in cross-section, as shown in Fig. 4, although it might vary some therefrom, if desired, within the limits of operability. However, for illustrative purposes, it will be described herein as square. As shown in Figs. 3–7, and referring particularly to Fig. 7, it will be seen that the ball 12 is formed on four of its sides with widened faces 18 which extends from corner to corner respectively of each of the side walls of the socket 6. Each of the widened faces 18 has a flat portion 19 which is parallel to the plane of its complemental side wall of the opening or socket 6, when the shafts 4 and 2 are in axial alinement. In other words, the four widened faces 18, from the standpoint of their length, form a square transversely of the ball at its middle portion in a plane at right angles to the axis of rotation of the male member, with their ends extending into the respective corners of the socket 6, as will be understood in Figs. 4 and 7. The clearance between each of the flat portions 19 and its adjacent side wall of the socket 6, is very small, for example approximately one thousandth of an inch. This permits said square portion of the ball to be inserted into the square socket in the female member easily, and have the movement in operation as later more fully described.

In Figs. 3 and 5-7 it will be seen that, at each of its opposite ends, each of the widened faces 18 is formed into a sharp point which symmetrically meets the similar point in the adjacent portion of the next adjacent face. In other words these points meet at the corners of the square of the male member to form sharp corners 20. These sharp corners could if desired be slightly rounded, but it is preferred to have them somewhat sharp as shown in Figs. 3-5, so as to increase the area in contact with the flat side walls of the socket 6, as will later be more fully understood. When the shafts 4 and 2 are in axial alinement as shown in Figs. 3 and 4, it will be seen that the corners 20 of the male member will be well up in the corresponding corners of the socket in the female member. When the shaft 4 of the male member is moved angularly with relation to shaft 2 of the female member, as shown in Fig. 6, the corners 20 of the male member will move in a curved path longitudinally along in the corners of the socket 6, the top one to the right and the bottom one to the left. The proportioning of parts of the retaining ring 14, the ball 12, and the shaft 4, is such as to permit a substantial amount of such angular movement of the shaft 4 with relation to the shaft 2.

To prevent cramping or binding of the respective flat portions 19 of the widened faces 18 against the corresponding flat wall of the socket 6, when the shaft 4 is at an angle to the shaft 2, the flat portions 19 are made reasonably narrow, as for example in the neighborhood of from one-eighth to three-sixteenth of an inch wide, more or less, when the clearance between the flat portions 19 and the side walls of the socket is in the neighborhood of one-thousandth of an inch, when the two shafts are in axial alinement. Within reasonable limits, the width of the flat portions 19 may be increased as the said clearance is increased, but this should not be carried too far in the interests of good operation.

To further facilitate smooth operation and prevent cramping or binding of the respective widened faces 18 against the corresponding flat side walls of the socket 6, when the shaft 4 is at an angle to the shaft 2, the widened faces 18 are each slightly curved or inclined inwardly toward the ball, along both sides of the flat portions 19, as shown at 21 in Figs. 3 and 5-7. The amount of such curvature or inclination is small enough to just permit the widened faces 18 to freely move with relation to the flat side walls of the socket 6 in the female member 1, as the shaft 4 is moved in angular relation to the shaft 2, which movement of the shaft 4 also moves the ball in the female member, as for example, from the position shown in Fig. 3 to the position shown in Fig. 6.

Assuming rotation of shaft 4 while it is at an angle to shaft 2, as shown in Fig. 6, it will be seen that during each such revolution each of the widened faces 18 will move from a position tilted toward the right at the top, to a position tilted toward the left at the bottom, as viewed in Fig. 6. During such roation of shaft 4 and the male member, it will be clear that the widened faces 18 will push against the flat side walls of the socket 6 and cause rotation of the female member and shaft 2. It is thus obvious that either of the shafts 4 or 2 may be the driving shaft and the other be the driven shaft. It is also obvious that power is transmitted by one or the other of the two rotating shafts to the other, by contact between the widened faces 18 and the flat side walls of the socket 6, regardless of whether the two shafts are in axial alinement or at an angle to each other.

Suitable lubrication may be further obtained, if desired, between the depression 11 of the bearing plate 10, and the ball 12, by forcing grease through the passageways 22—23, from a grease gun upon removal of the threaded plug 24. Or if desired a grease gun valve or fitting may be substituted for the plug 24.

The curved side edges 25, as shown in Figs. 3-6, of the widened faces 18, are well adapted to accommodate for the transmission of power to or from the widened faces and the flat sides of the socket 6 during the various relative positions of these parts when the shaft 4 is in any of its angular positions with relation to the shaft 2. However, other contours of said side edges 25 may be used if desired, just so they lead to sharp or curved points at the opposite ends of each of the widened faces 18 so that the corners of the male member transverse-square-portion may swing longitudinally along the corners formed by the intersection of the flat side walls of the socket 6 in the female member when the two shafts are at an angle with relation to each other.

It is thus seen that we have provided a novel universal joint for transmitting rotational power between two angularly positioned shafts, in which a noncircular portion of a male member operates within a noncircular opening in the female member, and without the use of any pins for transmitting power between the male and female members.

Having described our invention, we claim:

A universal joint for transmitting rotative power and longitudinal slip-free push and pull between two angularly positioned shafts, comprising, a female member having a square socket extending longitudinally thereinto and having flat side walls and longitudinally extending right angle corners, said female member having a closed end provided with a shaft fixed thereto and extending axially therefrom, a male member having a shaft with a ball fixed at one end thereof with the ball positioned in said socket, said ball having four radially extended portions arranged in a series angularly positioned therearound, each of said extended portions having a narrow flat face extending across the adjacent side wall of the socket and close thereto, each of said narrow flat faces having at each end a tapered sharp point seated in a corner of the socket when the two shafts are in axial alinement, said extended portions and narrow flat faces forming a square positioned in a plane transversely of the axis of rotation of the ball in an equator thereof, each of said tapered sharp points symmetrically meeting the adjacent tapered sharp point of the adjacent angularly positioned flat face, a bearing plate between the end of the ball and the closed end of the female member, a spring washer between the bearing plate and said closed end, a retaining ring secured to the other end of the female member, said ball being angularly movable in the retaining ring and normally urged thereagainst by the bearing plate and the spring washer, whereby when one of the shafts is at an angle with relation to the other and rotated said narrow flat faces and the flat side walls of the socket will have driving engagement and the tapered sharp points will swing longitudinally in the socket corners.

References Cited in the file of this patent
UNITED STATES PATENTS

| | | |
|---|---|---|
| 218,278 | Kimball | Aug. 5, 1879 |
| 1,274,254 | Fleek | July 30, 1918 |
| 1,286,945 | Coates | Dec. 10, 1918 |
| 1,311,679 | Chalifoux | July 29, 1919 |
| 1,799,488 | Webster | Apr. 7, 1931 |
| 1,860,762 | Wyrick | May 31, 1932 |